United States Patent
Casey et al.

(10) Patent No.: US 10,843,612 B1
(45) Date of Patent: Nov. 24, 2020

(54) LEG SUPPORT SYSTEM FOR SEATING ASSEMBLY

(71) Applicant: Ford Global Technologies, LLC, Dearborn, MI (US)

(72) Inventors: Carol Diane Casey, Dearborn, MI (US); Johnathan Andrew Line, Northville, MI (US); S. M. Akbar Berry, Windsor (CA); Andrew Matusko, Dexter, MI (US); Marcos Silva Kondrad, Macomb Township, MI (US); Rodney Charles Brinker, Eastpointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/400,155

(22) Filed: May 1, 2019

(51) Int. Cl.
*B60N 2/90* (2018.01)
*B60N 2/005* (2006.01)
*G05D 1/02* (2020.01)

(52) U.S. Cl.
CPC .............. *B60N 2/995* (2018.02); *B60N 2/005* (2013.01); *G05D 1/021* (2013.01)

(58) Field of Classification Search
None
See application file for complete search history.

(56) References Cited

U.S. PATENT DOCUMENTS

| | | | |
|---|---|---|---|
| 156,004 A * | 10/1874 | Wayland .................. | A61G 5/12 297/423.3 |
| 945,928 A * | 1/1910 | Fowler .................... | A47C 1/035 297/70 |
| 1,553,689 A * | 9/1925 | Hill ......................... | A47C 3/029 297/90 |
| 2,563,629 A * | 8/1951 | Watter .................... | B60N 2/995 297/423.36 |
| 2,571,080 A * | 10/1951 | Watter .................... | B60N 2/995 297/423.36 |
| 2,901,025 A | 8/1959 | Malitte | |
| 5,259,664 A * | 11/1993 | Cottle ...................... | A61G 5/12 297/423.26 |
| 6,517,160 B2 * | 2/2003 | Marcantoni ............ | A47C 7/506 297/423.28 |
| 6,685,271 B1 * | 2/2004 | Chang ..................... | A47C 7/52 297/423.36 |
| 8,474,076 B2 * | 7/2013 | Hornbach ............ | A61G 7/0755 5/624 |
| 9,295,333 B2 | 3/2016 | Yin et al. | |
| 9,463,717 B2 * | 10/2016 | Yin ........................ | B60N 2/005 |
| 10,322,044 B2 * | 6/2019 | Upchurch .............. | H02P 31/00 |
| 10,421,549 B2 * | 9/2019 | Jakubowski ....... | B64D 11/0643 |
| 10,479,251 B2 * | 11/2019 | Hur ........................ | F16H 25/20 |

(Continued)

*Primary Examiner* — David E Allred
(74) *Attorney, Agent, or Firm* — David Coppiellie; Price Heneveld LLP (57) ABSTRACT

A vehicle seating assembly includes a seat and a base member with a support member pivotably coupled to the seat and rotationally movable between first and second positions. A bracket assembly is disposed between the support member and the base member and is coupled to an actuator. A supplemental support member is coupled to the bracket assembly and the support member. The supplemental support member is translationally movable relative to the support member between a retracted position and a fully extended position.

18 Claims, 11 Drawing Sheets

(56) References Cited

U.S. PATENT DOCUMENTS

| | | | |
|---|---|---|---|
| 2005/0012377 A1* | 1/2005 | Ito | B60N 2/0232 |
| | | | 297/423.26 |
| 2018/0162243 A1 | 6/2018 | Akaike et al. | |
| 2018/0304791 A1* | 10/2018 | Hur | F16H 19/04 |

* cited by examiner

LEG SUPPORT SYSTEM FOR SEATING ASSEMBLY

FIELD OF THE DISCLOSURE

The present disclosure generally relates to a vehicle seating assembly. More specifically, the present disclosure relates to a vehicle seating assembly that includes a leg support mechanism.

BACKGROUND OF THE DISCLOSURE

Vehicle seating assemblies may include mechanisms that provide leg support.

Mechanisms for supporting passenger legs in a variety of positions may be disposed in a vehicle seating assembly. Mechanisms for supporting passenger legs may be adaptable to passenger preferences and body types.

SUMMARY OF THE DISCLOSURE

According to a first aspect of the present disclosure, a vehicle seating assembly includes a seat and a base member with a support member pivotably coupled to the seat and rotationally movable between first and second positions. A bracket assembly is disposed between the support member and the base member and is coupled to an actuator. A supplemental support member is coupled to the bracket assembly and the support member. The supplemental support member is translationally movable relative to the support member between a retracted position and a fully extended position.

Embodiments of the first aspect of the present disclosure can include any one or a combination of the following features:
- in the first position, the support member is in a substantially vertical position transverse to an underbody frame;
- in the first position, the support member is positioned at a first angle between a substantially vertical line along a front portion of the seat and a centerline support member;
- in the second position, the support member is positioned at a second angle between a substantially vertical line along the front portion of the seat and a centerline of the support member;
- the first position includes a stored position;
- the second position includes a fully deployed position;
- the support member is positionable in a plurality of intermediate deployed positions between the stored position and the fully deployed position;
- the supplemental support member is fully nested within the support member in the retracted position;
- the supplemental support member is partially nested within the support member in the fully extended position;
- a guide member is disposed in the support member;
- an engagement member is disposed on the supplemental support member and is pivotably coupled to the bracket assembly;
- the bracket assembly comprises a rotating bracket coupled to the actuator and a lever pivotably coupled to the rotating bracket;
- the lever is pivotably coupled to the engagement member; and
- the engagement member includes a first engagement member and a second engagement member.

According to a second aspect of the present disclosure, a vehicle seating assembly including a seat, a base member, and a bracket assembly coupled to a panel secured to the base member. The bracket assembly includes a rotating bracket and a lever with a support member pivotably coupled to the seat and selectively positionable in a stored position, a fully deployed position, and an intermediate deployed position between the stored position and the fully deployed position. The bracket assembly extends between an actuator and the support member. The actuator is selectively engageable to position the support member in a stored position, a fully deployed position, and an intermediate deployed position between the stored position and the fully deployed position.

Embodiments of the second aspect of the present disclosure can include any one or a combination of the following features:
- a telescoping supplemental support member is disposed within the support member and is selectively positionable in a retracted position, a fully extended position, and an intermediate extended position between the retracted position and the fully extended position;
- an elongated guide member is disposed in the support member, wherein the telescoping supplemental support member is slidably coupled to a channel in the elongated guide member, and slides along the elongated guide member between the retracted position and the fully extended position; and
- toothed interface is between the actuator and the bracket assembly.

According to a third aspect of the present disclosure, a leg support system includes a seat and a base member. The support member is pivotably coupled to a forward portion of the seat and is positionable between a first position and a second position. A supplemental support member is slidably coupled to the support member and is movable between a retracted position and a fully extended position. A bracket assembly is partially disposed between the seat and the base member and includes a lever pivotably coupled to a bracket. The lever is coupled to the support member and the supplemental support member. The bracket is coupled to an actuator. The actuator is selectively operable to move the support member between the first and second positions, and the actuator is selectively operable to move the supplemental support member between the retracted and the fully extended positions.

Embodiments of the third aspect of the present disclosure can include any one or a combination of the following features:
- the support member is rotatable about a pivot point disposed at a front portion of the seat;
- in the first position, the support member is positioned in a substantially vertical position between the pivot point and an underbody frame;
- in the second position, the support member is disposed at an approximately 30 degree to approximately 70 degree angle from the first position;
- a toothed wheel is coupled to the actuator;
- wherein the toothed wheel and the toothed portion of the bracket form a toothed interface; and
- the leg support system is disposed in a vehicle seating assembly.

These and other aspects, objects, and features of the present disclosure will be understood and appreciated by those skilled in the art upon studying the following specification, claims, and appended drawings.

DETAILED DESCRIPTION

Figure 1:
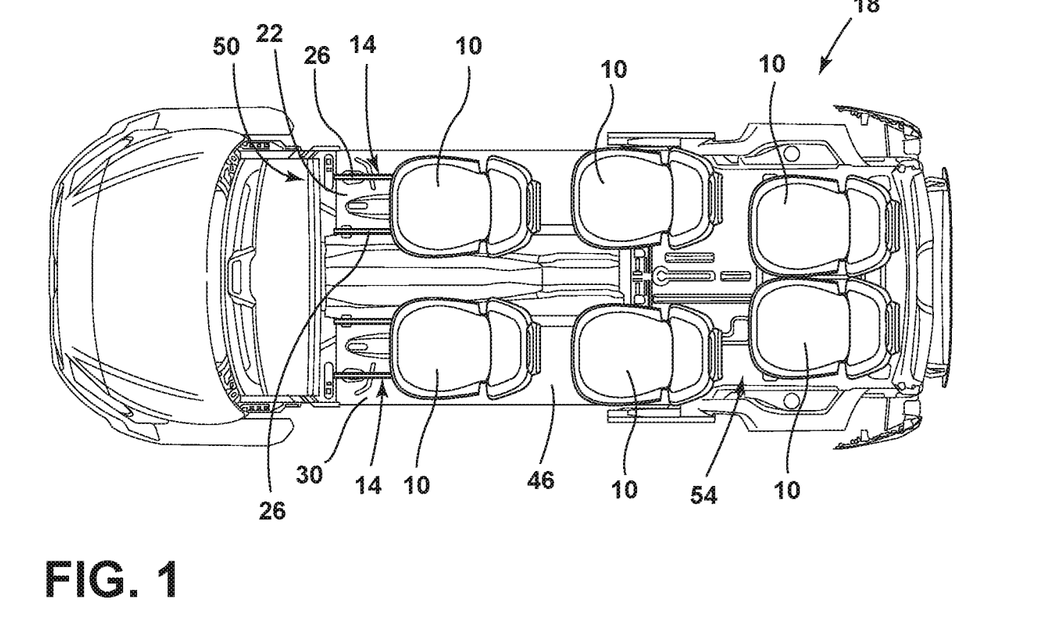
FIG. 1 is a top plan view of a portion of a vehicle having a plurality of vehicle seating assemblies in a first configuration.

For purposes of description herein, the terms "upper," "lower," "right," "left," "rear," "front," "vertical," "horizontal," and derivatives thereof shall relate to the concepts as oriented in FIG. 1 with respect to the vehicle 18. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to the vehicle seating assembly 10 described below and shown in the attached figures, a vehicle seating assembly 10 may be described from the vantage point of a passenger 12 seated in the seating assembly 10. The side of a seating assembly 10 disposed on a right side of a seated passenger 12 may be referred to as a right side or a first side of the seating assembly 10. The side of a seating assembly 10 disposed on a left side of a seated passenger 12 may be referred to as a left side or a second side of the seating assembly 10.

Figure 2:
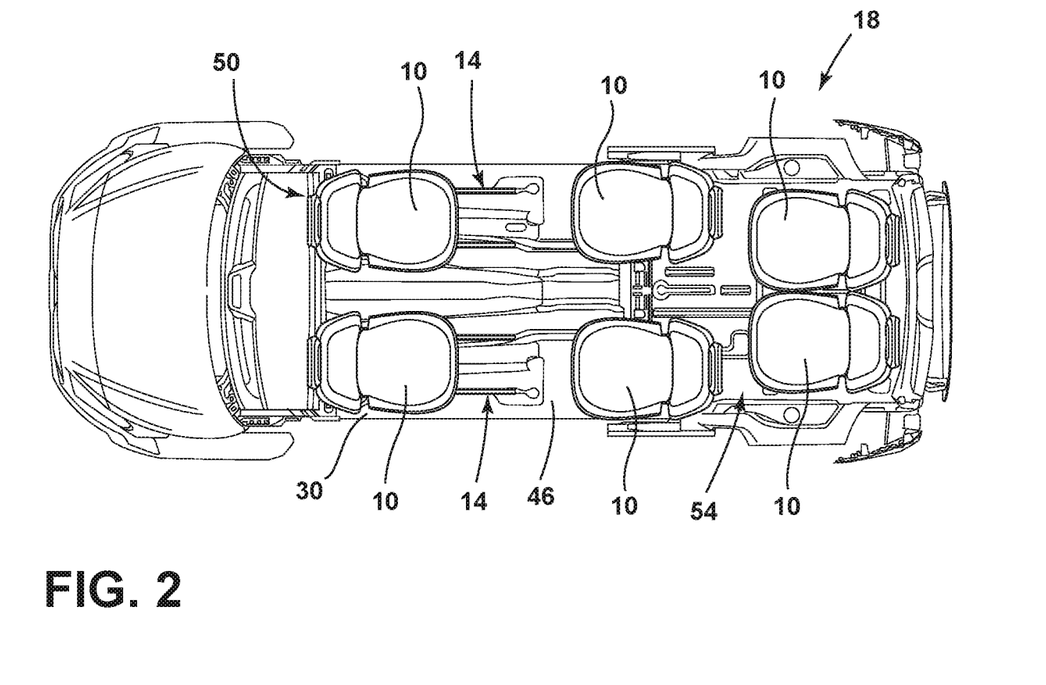
FIG. 2 is a top plan view of a portion of a vehicle having a plurality of vehicle seating assemblies in a second configuration.
Figure 3:
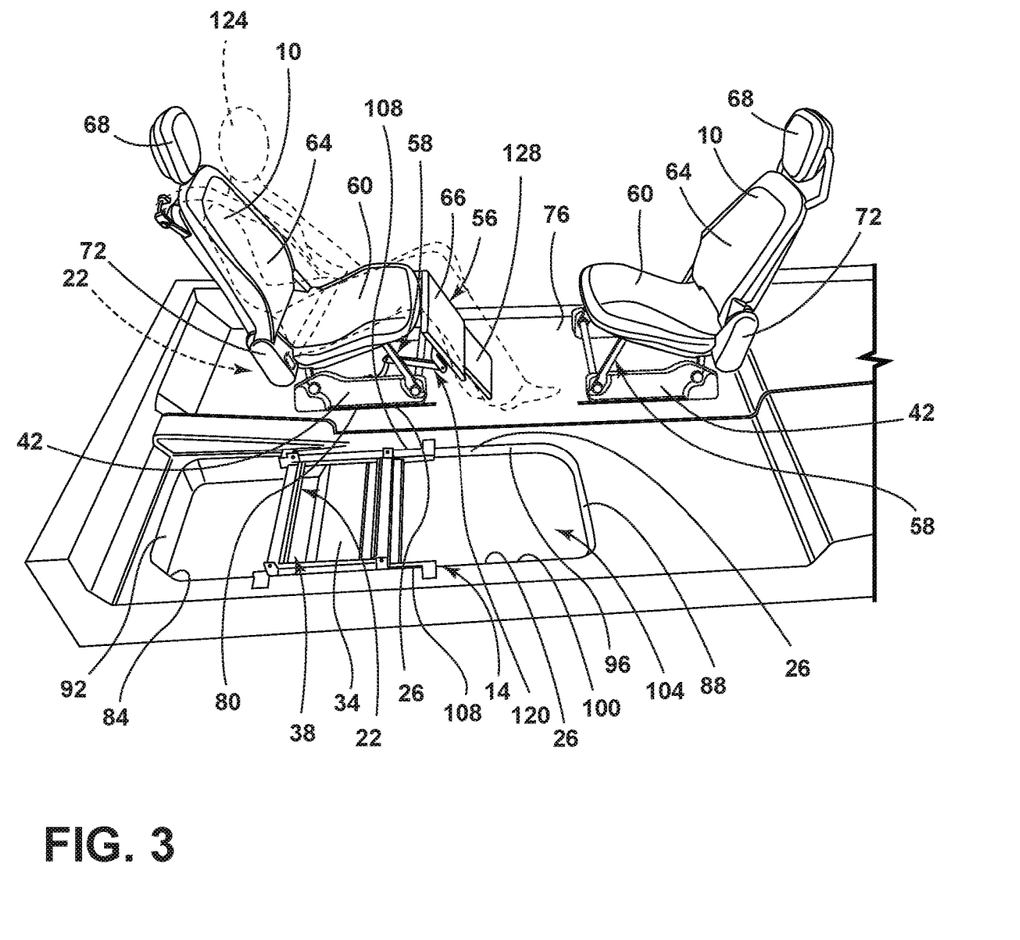
FIG. 3 is a side perspective view of a floor of a vehicle including a plurality of vehicle seating assemblies and a track assembly.

Referring to FIGS. 1-3, a vehicle seating assembly 10 may include various features for providing movability of the vehicle seating assembly 10. The vehicle seating assembly 10 may include a track assembly 14 for translating the vehicle seating assembly 10 fore and aft within the vehicle 18. The track assembly 14 may be a long track assembly 14 or a short track assembly 14 for full or partial movement of the seating assembly 10 within the vehicle 18, respectively. The seating assembly 10 may further include a platform 22 extending between tracks 26 of the track assembly 14. The platform 22 and the track assembly 14 may be integrated into the vehicle underbody frame 30 to provide structural stiffness and side-impact performance. The platform 22 may include cross-members 34 configured to allow the structural stiffness needed for side-impact performance to move with the seating assembly 10, allowing the seating assembly 10 to be moved into various positions while maintaining structural support. Further, the platform 22 may also include a universal attachment system 38 to allow various seating assemblies 10 to couple with the platform 22 including, for example, rotating seating assemblies (not shown). Also, a seating assembly 10 may have a base member 42 that may be a module that may be received by the universal attachment system 38 of the platform 22. The platform 22 may include extendable, or widening, cross-members 34 that may be adjustable to configure the platform 22 to receive base members 42 of various widths that may correspond to seating assemblies 10 of various widths.

Referring now to FIGS. 1 and 2, a vehicle underbody frame 30 is shown having a plurality of seating assemblies 10. The vehicle underbody frame 30 may include a floor panel 46 configured to support the plurality of seating assemblies 10. The vehicle underbody frame 30 may further include a front area 50 and a rear area 54. One or more of the plurality of seating assemblies 10 may be configured as the movable vehicle seating assembly 10. It is contemplated that the vehicle 18 may be any type of vehicle, for example, a car, a truck, a van, or other vehicle. It is also contemplated that the vehicle 18 may be an autonomous vehicle. Additionally, it is contemplated that the concept set forth in this disclosure may be utilized in the front area 50 of the vehicle 18 as well as the rear area 54 of the vehicle 18, depending on the configuration of the vehicle 18.

A portion of the plurality of seating assemblies 10 of FIGS. 1 and 2 is shown positioned within the front area 50 of the vehicle 18 with one or more of the plurality of seating assemblies 10 being configured as a movable vehicle seating assembly 10. Another portion of the plurality of seating assemblies 10 may be positioned elsewhere within the vehicle 18. The plurality of seating assemblies 10 are operably coupled to the floor panel 46 of the vehicle 18 by track assemblies 34. Any one of the plurality of seating assemblies 10 may be configured as a movable vehicle seating assembly 10. The vehicle seating assemblies 10 may be translatable along the respective track assembly 14 between a first position of the seating assembly 10 (FIG. 1) and a second position of the seating assembly 10 (FIG. 2). Additionally, the vehicle seating assemblies 10 may be rotatable relative to the platform 22 using a swivel assembly (not shown). Where the vehicle seating assemblies 10 are rotatable, the vehicle seating assemblies may further be movable between a forward facing position within the vehicle 18 (FIG. 1) and a rearward facing position within the vehicle 18 (FIG. 2).

Referring now to FIG. 3, the seating assembly 10 may include a seat 60 and a seatback 64. The seat 60 may be disposed above the base member 42. A linkage assembly 58 for securing the seat 60 to the base member 42 may be disposed between the seat 60 and the base member 42.

Passengers 12 may desire a seating assembly 10 with features that increase passenger 12 comfort. Such features may include a leg support system 56 for supporting passenger 12 legs. The leg support system 56 may be conveniently stored below the seat 60 and deployed in various positions to suit the individual needs of a passenger 12. As such, passenger 12 comfort may be increased.

Referring to FIG. 3, a leg support system 56 may be at least partially disposed between the seat 60 and the base member 42. With reference to FIGS. 3, 6-10, and 17, the leg support system 56 may include a support member 66, a supplemental support member 128, a bracket assembly 120 for moving the support member 66 and the supplemental support member 128, and a rotational assembly 136 for driving the bracket assembly 120. With reference again to FIG. 3, the support member 66 may be pivotably coupled to the seat 60. The seatback 64 may be pivotably coupled to the seat 60. A headrest 68 may be coupled to the seatback 64. According to various examples, the seating assembly 10 may include covers 72 positioned on either side of the seating assembly 10.

With continued reference to FIG. 3, a floor cover 76 may be positioned above and parallel to the floor panel 46 and may be configured to conceal the track assembly 14. The floor cover 76 may define a plurality of slots 80. The plurality of slots 80 may be defined over the tracks 26 of the track assembly 14, such that the platform 22 may extend at least partially through the plurality of slots 80 to couple to the track assembly 14. Each of the slots 80 may be defined to have a length selected to allow movement of the seating assembly 10 between the first position of the seating assembly 10 (FIG. 1) and the second position of the seating assembly 10 (FIG. 2).

The floor cover 76 may further conceal a cutout 84 of the floor panel 46. The cutout 84 may be configured to house the track assembly 14. The cutout 84 may include front and rear walls 88, 92 and sidewalls 96, 100. The sidewalls 96, 100 may be spaced apart and may frame a void 104 of the cutout 84. The track assembly 14 may be positioned within the void 104. In various examples, the platform 22 may at least partially be positioned within the void 104 and the track assembly 14. The track assembly 14 may include guides 108 positioned on first and second sides of the seating assembly 10 and operably coupled with the cutout 84. The guides 108 may be positioned in pairs. Each guide 108 may be operably coupled with one of the sidewalls 96, 100, such that the track assembly 14 is recessed within the cutout 84, as the seating assembly 10 is translated between the first position of the seating assembly 10 (FIG. 1) and the second position of the seating assembly 10 (FIG. 2).

Referring to FIGS. 1-16, a vehicle seating assembly 10 may include a seat 60, a base member 42, and a support member 66. The support member 66 may be pivotably coupled to the seat 60 and rotationally movable between a first position and a second position. In one example, the first position of the support member 66 may be a stored position A, and the second position of the support member 66 may be a fully deployed position B. The support member 66 may include a bracket assembly 120 disposed between the support member 66 and the base member 42. The bracket assembly 120 may be coupled to an actuator 124. A supplemental support member 128 may be coupled to the bracket assembly 120 and the support member 66. The supplemental support member 128 may be translationally movable relative to the support member 66 between a retracted position a and a fully extended position b.

Figure 4:
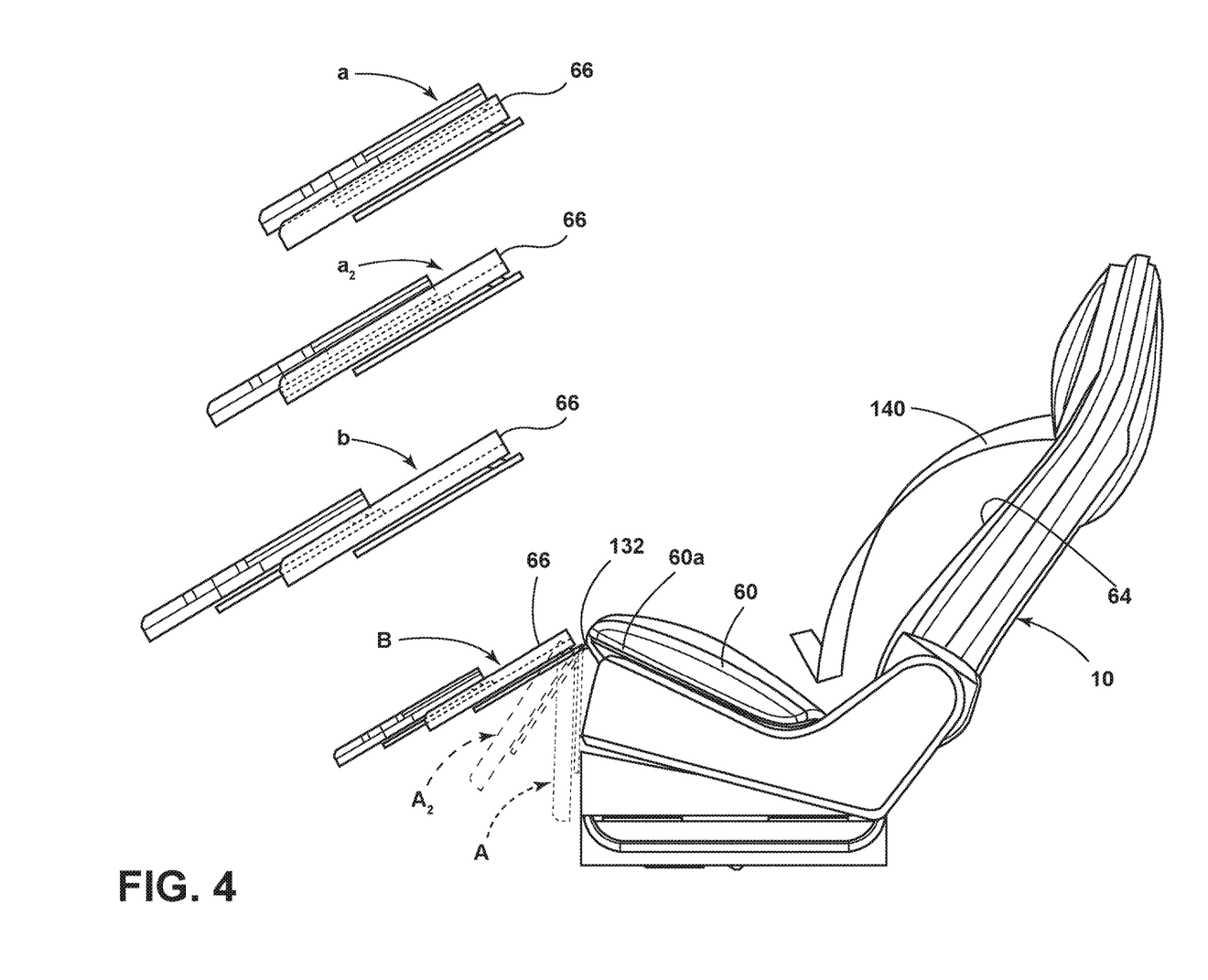
FIG. 4 is a left side elevational view of a seating assembly with a support member positioned in a stored position, a fully deployed position, and an intermediate deployed position.

Referring to FIG. 4, a seating assembly 10 is shown with a seat 60 and a seatback 64. The support member 66 may be pivotally coupled to the front portion 60a of the seat 60 at pivot point 132. A rotational assembly 136 (see FIGS. 9 and 10) and a bracket assembly 120 (see FIGS. 6-8) may move the support member 66 between a stored position A and a fully deployed position B. The rotational assembly 136 and the bracket assembly 120 (see FIGS. 6-8) may also position the support member 66 in an intermediate deployed position (for example, $A_1$, $A_2$, $A_3$). The supplemental support member 128 is shown in the retracted position a, a second intermediate retracted position $a_2$, and a fully extended position b. A seat belt 140 is shown disposed on the seating assembly 10.

Figure 5:
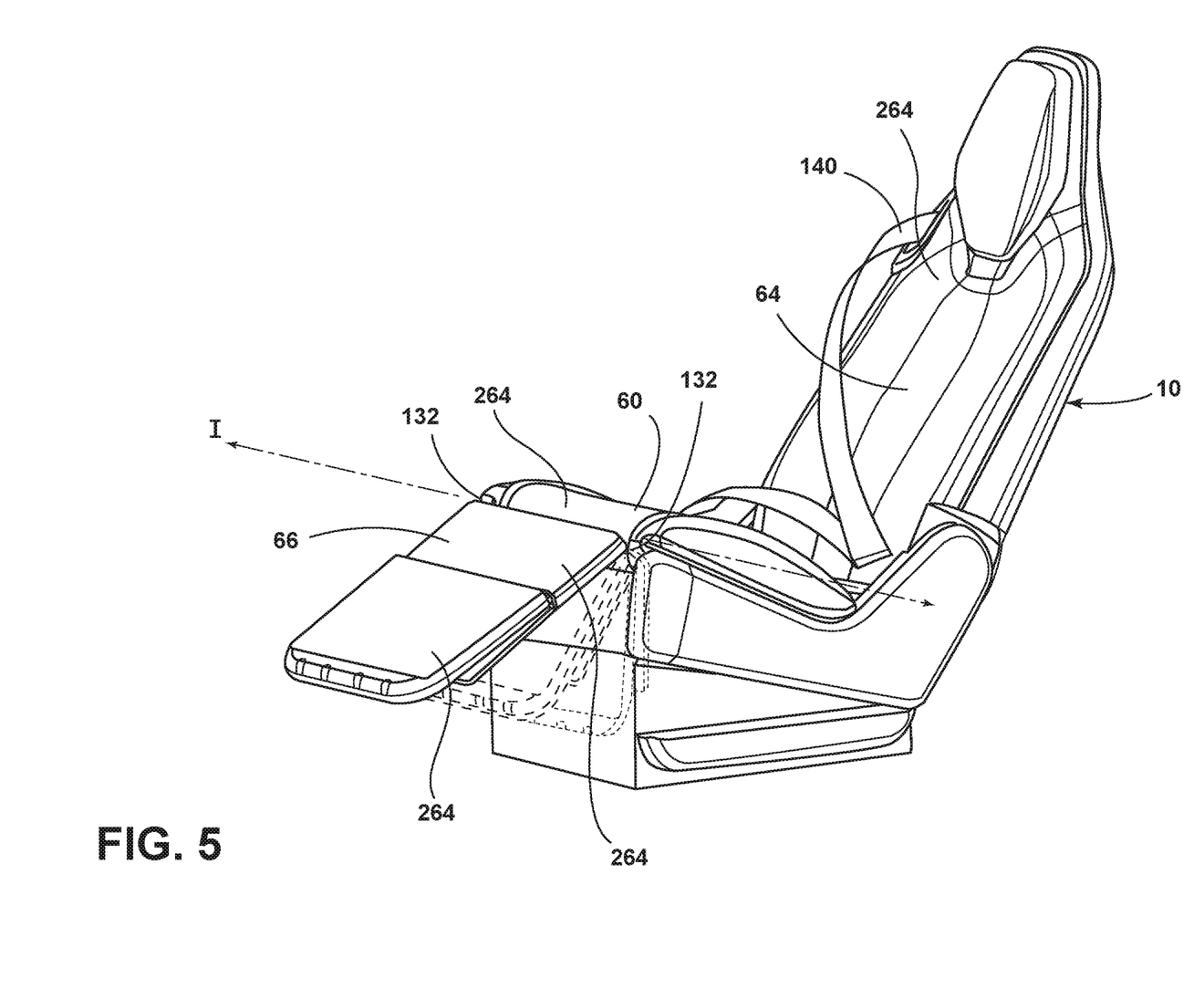
FIG. 5 is a left side perspective view of a seating assembly with a support member positioned in a stored position, a fully deployed position, and an intermediate deployed position.
Figures 12, 13:
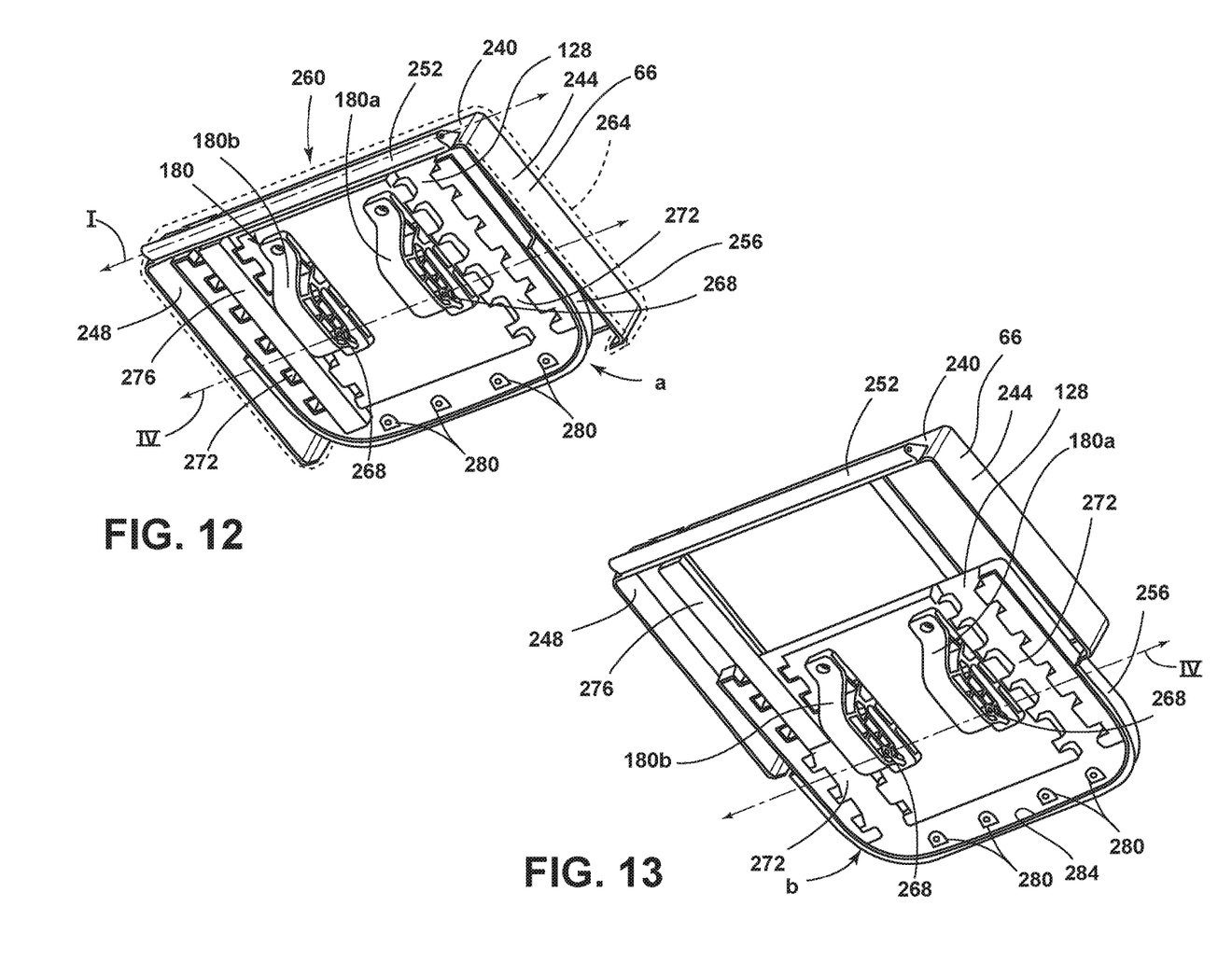
FIG. 12 is a bottom perspective view of the support member and the supplemental support member in a retracted position, according to an example.
FIG. 13 is a bottom perspective view of the support member and the supplemental support member of FIG. 12 in an extended position.

Referring now to FIG. 5, a perspective view is shown of the seating assembly 10 of FIG. 4. The seating assembly 10 is shown with a seat 60 and a seatback 64. The support member 66 is shown in the stored position A, an intermediate deployed position (for example, $A_2$), and a fully deployed position B. Referring to FIGS. 5 and 12, a hinge assembly 252 may be disposed between the seat 60 and the support member 66. The hinge assembly 252 may define an axis I that extends through the pivot points 132. Referring again to FIG. 5, trim 264 may be disposed over the seat 60, the seatback 64, and the support member 66. As such, the support member 66 and the supplemental support member 128 may be arranged in a variety of positions to suit passenger 12 preferences.

Figures 6, 6A:
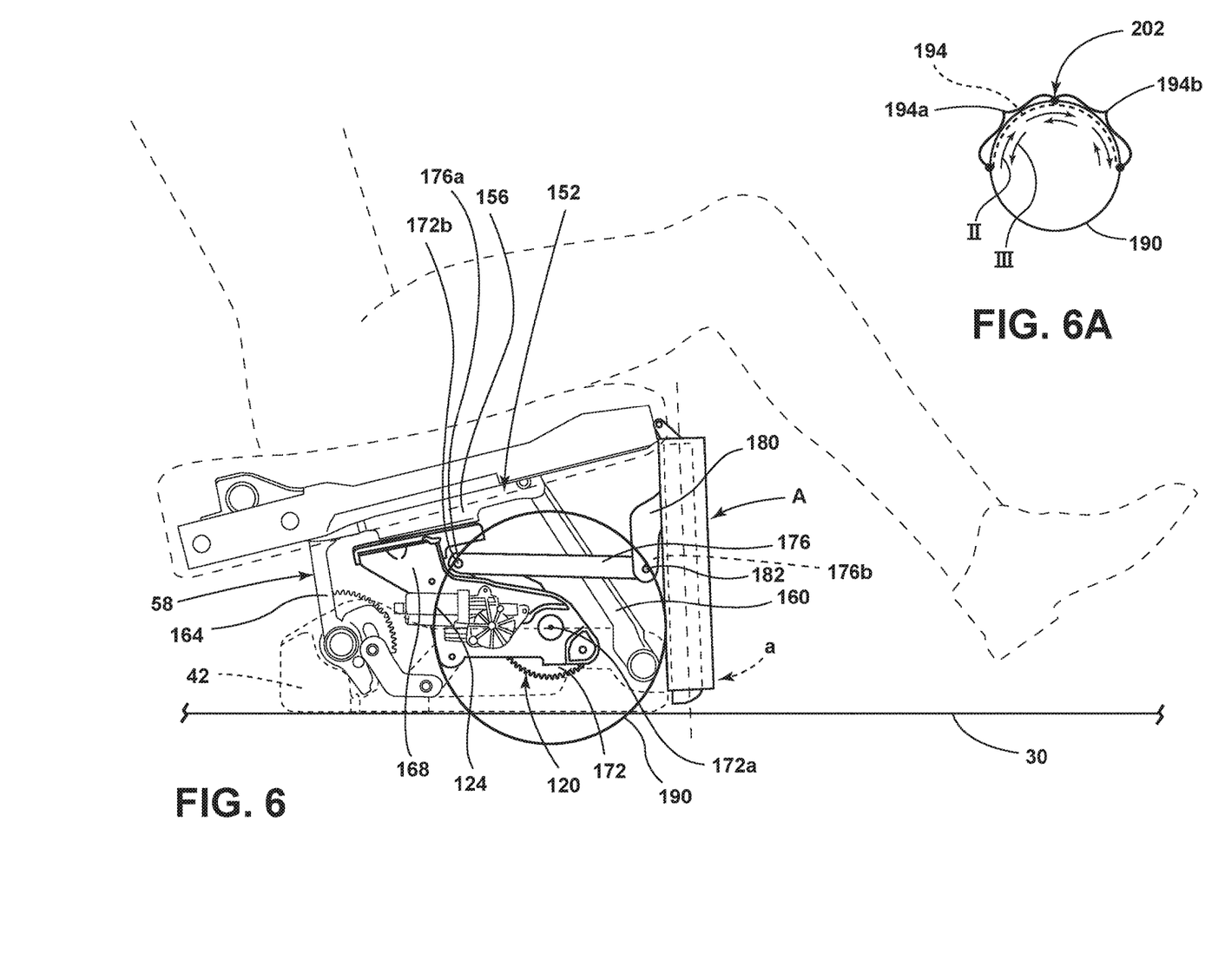
FIG. 6 is right side elevational view of a seat with a support member in a stored position and a supplemental support member in a retracted position.
FIG. 6A is an exploded view of the circle that represents a path that the second pivot point of the bracket moves along.

With reference to FIG. 6, the leg support system 56 is shown with the support member 66 in a stored position A. A cross-sectional view is shown of the base member 42, a linkage assembly 58, and a seat frame assembly 152. The seat frame assembly 152 may include a seat pan 156. The linkage assembly 58 may include a first linkage arm 160 and a second linkage arm 164 that may be pivotably coupled to the seat pan 156 and the base member 42. A plate 168 may be coupled to the base member 42 and the seat frame assembly 152. The actuator 124 and the bracket assembly 120 may be mounted to the plate 168. The bracket assembly 120 may include a bracket 172 and a lever 176. The bracket 172 may include a first pivot point 172a. The bracket 172 may be coupled to the plate 168 at the first pivot point 172a. The bracket 172 may include a second pivot point 172b. The bracket 172 may be coupled to the lever 176 at the second pivot point 172b. The first pivot point 172a may be fixed. The second pivot point 172b may be movable.

With continuing reference to FIG. 6, the bracket 172 may be pivotably coupled to the lever 176. The lever 176 may include a first pivot point 176a and a second pivot point 176b. The second pivot point 172b of the bracket 172 may share an axis with the first pivot point of 176a of the lever 176. The second pivot point 176b of the lever 176 may share an axis IV (see FIG. 12) with a pivot point 182 disposed through the engagement member 180 of the support member 66. The lever 176 may be disposed between the bracket 172 and the support member 66. The support member 66 is shown in a first position A. The first position A may be referred to as a substantially vertical position. The supplemental support member 128 is shown in the retracted position a. The support member 66 may be transverse to an underbody frame 30. In the stored position, the support member 66 may abut a first side 42a of the base member 42 and a second side 42b (not shown, see FIG. 11) of the base member 42. In the stored position A, the support member 66 may be generally parallel to the longitudinal front edge of the first side 42a of the base member 42 and a longitudinal front edge of the second side 42b of the base member 42. As such, the support member 66 may be efficiently stored below the seat 60.

Figure 7:
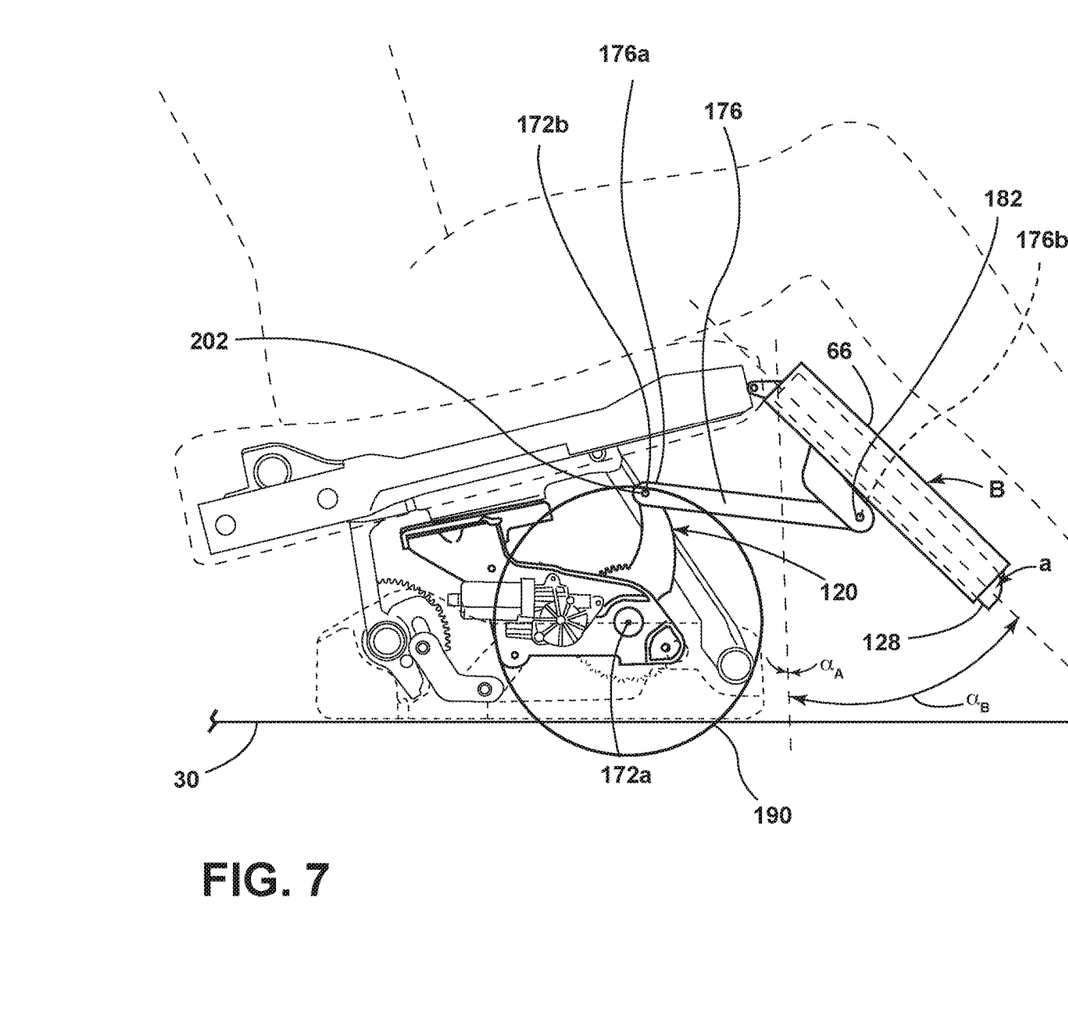
FIG. 7 is a right side elevational view of a seat with a support member in an intermediate deployed position and a supplemental support member in a retracted position.
Figures 8, 8A:
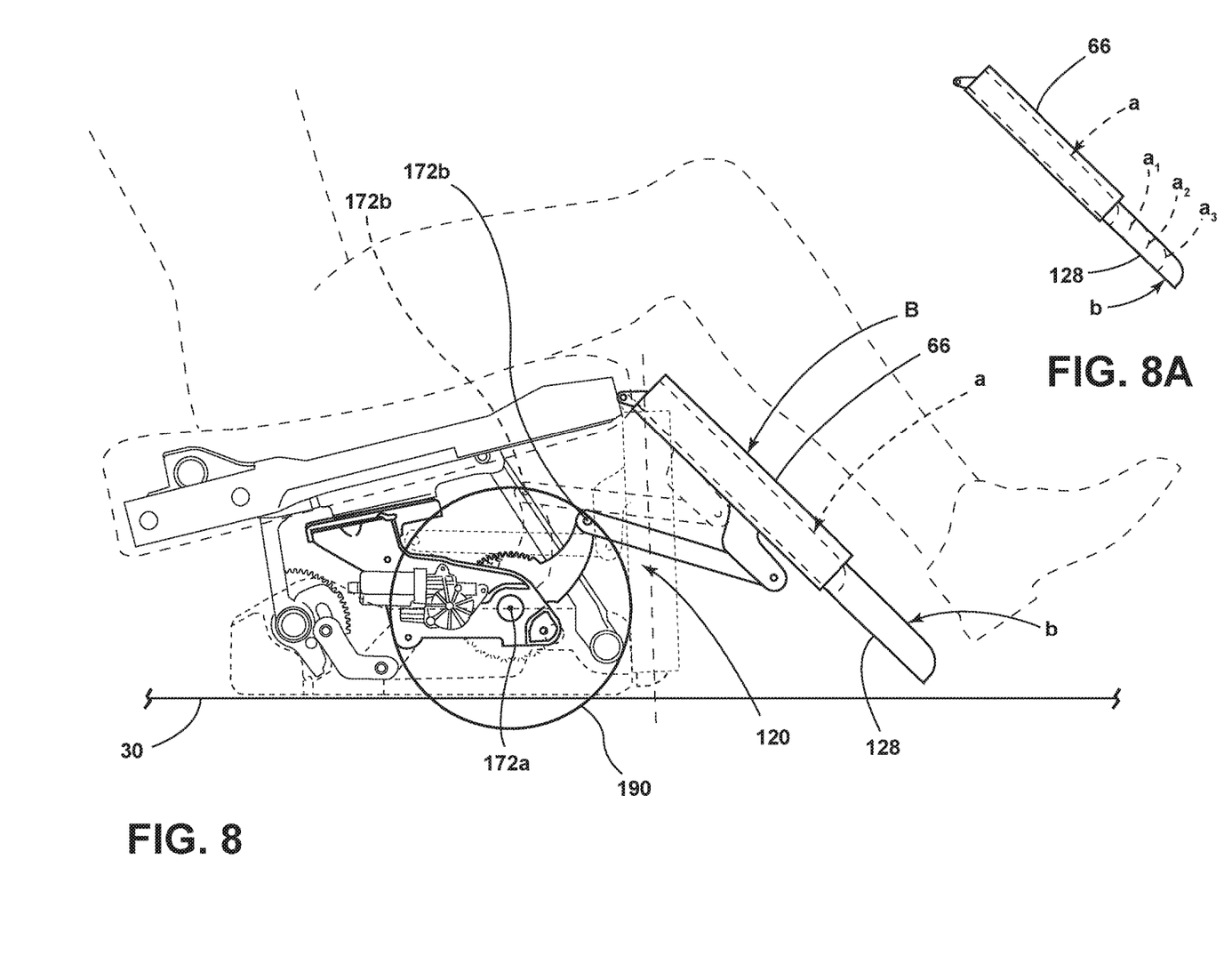
FIG. 8 is a right side elevational view of a seat with a support member in a fully deployed position and a supplemental support member in a fully extended position.
FIG. 8A is an exploded view of the supplemental support member in a retracted position, a first intermediate extended position, a second intermediate extended position, a third intermediate extended position, and a fully extended position.

With reference to FIGS. 6-8, the movement of the support member 66 and the supplemental support member 128 may be described with reference to a path 194 that the arm of the bracket 172 follows. A superimposed circle 190 shows a path 194 the second pivot point 172b of the bracket 172 may follow as the bracket 172 rotates around a fastener disposed through the first pivot point 172a of the bracket 172 and the plate 168. The circumference 198 of the circle 190 may provide a path 194 that the second pivot point 172b may travel along to move the support member 66 between a stored position A and a fully deployed position B and to move the supplemental support member 128 between the retracted position a and the fully extended position b. The path 194 may include a first portion 194a and a second portion 194b. A location 202 may be disposed at the top of the circle 190. Location 202 may be between the first portion 194a of the path 194 and the second portion 194b of the path 194. At location 202, movement of the arm of the bracket 172 may switch from an upward motion to a downward motion.

With continuing reference to FIG. 6A, as the second pivot point 172b moves along the first portion 194a of the path 194 in the direction shown by arrow II, the support member 66 may move from the stored position A to the fully deployed position B. As the second pivot point 172b moves along the second portion 194b of the path 194 in the direction shown by arrow II, the support member 66 may remain in the fully deployed position B, and the supplemental support member 128 may move from the retracted position a to the fully extended position b.

With reference to FIG. 6A, as the second pivot point 172b moves along the second portion 194b of the path 194 in the direction shown by arrow III, the second supplemental member 128 may move from the fully extended position b to the retracted position a. As the second pivot point 172b moves along the first portion 194a of the path 194 in the direction shown by arrow III, the support member 66 may move from the fully deployed position B to the stored position A. As such, positioning of the support member 66 and the supplemental support member 128 may be explained by referring to the path 194 of the arm of the bracket 172.

Figure 7A:
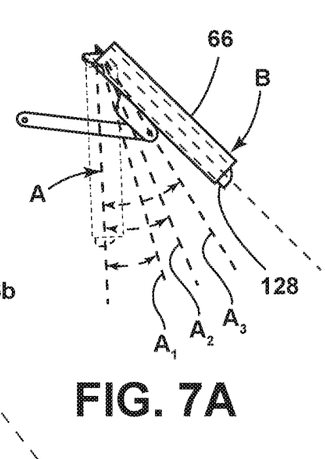
FIG. 7A is an exploded view of the support member in a stored position, a first intermediate deployed position, a second intermediate deployed position, a third intermediate deployed position, and a fully deployed position.

With reference to FIG. 7, the leg support system 56 is shown with the support member 66 in the fully deployed position B and the supplemental support member 128 in the retracted position a. The support member 66 is shown in the fully deployed position B. The supplemental support member 128 is shown in the retracted position a. When the support member 66 is in the fully deployed position B and the supplemental support member 128 is in the retracted position a, then the second pivot point 172b is on the top of the circle 190 at location 202. Referring to FIG. 7A, an exploded view of the support member 66 is shown in the stored position A, the first intermediate deployed position $A_1$, the second intermediate deployed position $A_2$, and the third intermediate deployed position $A_3$, and the fully deployed position B. An angle $\alpha_\beta$ may be disposed between a centerline of the support member 66 in the substantially vertical position (FIGS. 6, 7) and a centerline of the support member 66 in a fully deployed position B. An angle $\alpha_\beta$ may be disposed between a centerline of the support member 66 in the substantially vertical position (FIGS. 6, 7) and a centerline of the support member 66 in an intermediate deployed position (for example, $A_1$, $A_2$, $A_3$) or a fully deployed position B. As such, the support member 66 may be arranged in many positions to suit individual passenger 12 preferences.

Referring to FIG. 8, the support member 66 is shown in the fully deployed position B. The supplemental support member 128 is shown in the retracted position a and the fully extended position b. When the support member 66 is in the fully deployed position B and the supplemental support member 128 is in the fully extended position b, then the second pivot point 172b is on the second portion 194b of the path 194 around the circle 190. In the exploded view of FIG. 8A, the supplemental support member 128 is shown in the retracted position a, the first intermediate extended position $a_1$, the second intermediate extended position $a_2$, the third intermediate extended position $a_3$, and the fully extended position b. As such, the supplemental support member 128 may be positioned to suit various passenger 12 leg lengths.

Figure 9:
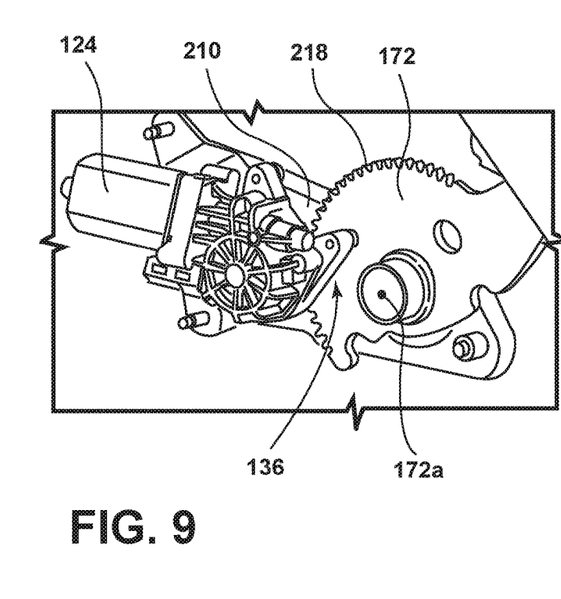
FIG. 9 is a right perspective view of an actuator and a toothed bracket.
Figure 10:
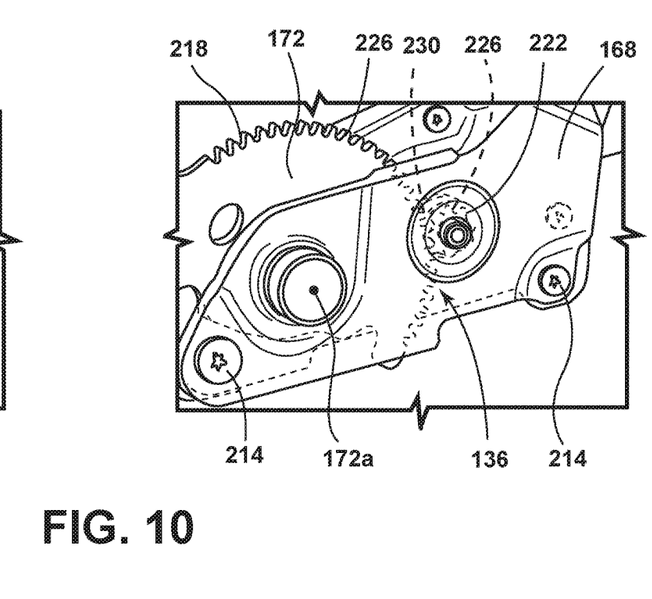
FIG. 10 is a left perspective view of a toothed wheel and a toothed bracket.

With reference now to FIGS. 9 and 10, the actuator 124 and the bracket 172 are shown. The actuator 124 and the bracket 172 may be mounted to the plate 168 with a mounting piece 210 and fasteners 214. The actuator 124 may be a rotary actuator 124 that drives a toothed wheel 222 that may be coupled to the actuator 124. The teeth 226 on the toothed wheel 222 and the teeth 226 on the toothed portion 218 of the bracket 172 may form a toothed interface 230.

Referring to FIGS. 9 and 10, the actuator 124, in combination with the toothed wheel 222, may move the bracket 172 between various positions defined by the teeth 226 of the bracket 172. The various positions may correspond to at least the stored position A, the first intermediate deployed position $A_1$, the second intermediate deployed position $A_2$, the third intermediate deployed position $A_3$, and the fully deployed position B for the support member 66. The various positions may correspond to at least the retracted position a, the first intermediate retracted position $a_1$, the second intermediate retracted position $a_2$, the third intermediate retracted position $a_3$, and the fully extended position b for the supplemental support member 128.

Referring again to FIGS. 9 and 10, when the actuator 124 is not activated to rotate, then the bracket 172 may stay in a fixed position relative to the toothed wheel 222. A predetermined fixed position of the bracket 172 may correspond to at least the stored position A, the first intermediate deployed position $A_1$, the second intermediate deployed position $A_2$, the third intermediate deployed position $A_3$, and the fully deployed position B of the support member 66. Similarly, a predetermined fixed position of the bracket 172 may corresponded to at least the retracted position a, the first intermediate extended position $a_1$, the second intermediate extended position $a_2$, the third intermediate extended position $a_3$, and the fully extended position b. The rotational assembly 136 may also be described as a rack (toothed portion 218 of bracket 172) and pinion (toothed wheel 222) system. As such, the plurality of teeth 226 on the bracket 172 may correspond to predetermined support member 66 positions and predetermined supplemental support member 128 positions.

Figure 11:
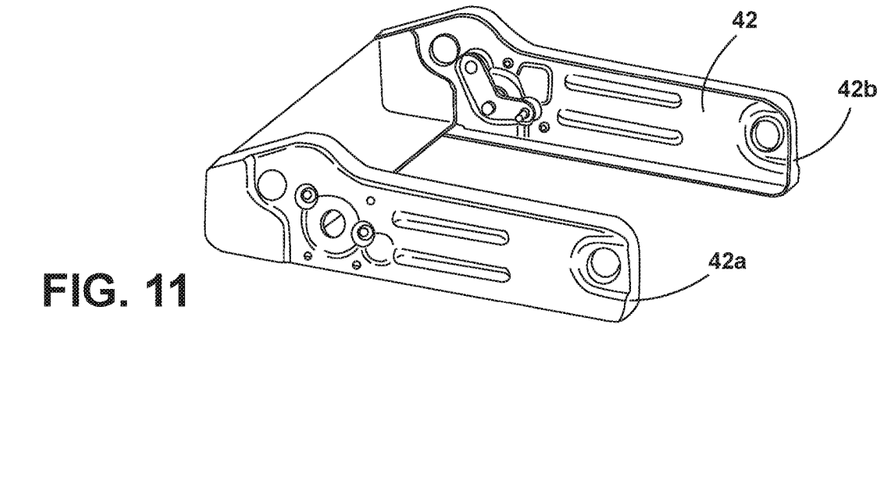
FIG. 11 is a right side perspective view of a base member.

Referring to FIG. 11, the base member 42 is shown. The rotational assembly 136 and the bracket assembly 120 may be designed to fit between the first side portion 42a of the base member 42 and the second side portion 42b of the base member 42.

Referring to FIGS. 12-16, detailed views of the support member 66 and the supplemental support member 128 are shown. An example of the support member 66 and the supplemental support member 128 is shown. The supplemental support member 128 is shown in the retracted position a. The support member 66 may include an end wall 240 designed to be positioned next to the front portion 60a of the seat 60. The support member 66 may also include a first sidewall 244 and a second sidewall 248. A hinge assembly 252 may be disposed on the end wall 240. The hinge assembly 252 may include a channel for receiving one or more pins for pivotably coupling the hinge assembly 252 to a front portion 60a of the seat 60. The supplemental support member 128 may include a cover 256. Trim 264 may be disposed over the support member 66 and the supplemental support member 128. The trim 264 that may be disposed over the support member 66 and the supplemental support member 128 may match the trim 264 that may be disposed over the seat 60 and the seatback 64. See FIG. 5.

With continued reference to FIG. 12, the supplemental support member 128 is shown fully nested in the support member 66. In the retracted position a, the supplemental support member 128 is shown between the first and second sidewalls 244, 248 and adjacent to the end wall 240. The supplemental support member 128 may include an engagement member 180. The engagement member 180 may include a first engagement member 180a and a second engagement member 180b. The first engagement member 180a and the second engagement member 180b may be pivotally coupled to the lever 176 of the bracket assembly 120. The first engagement member 180a and the second engagement member 180b may include holes 268 for receiving one or more pins or other fasteners for coupling the first engagement member 180a and the second engagement member 180b to the pivot point 176b of the lever 176. An axis IV may extend through the holes 268 in the first and second engagement members 180a, 180b. The holes 268 in the first and second engagement members 180a, 180b may define the axis IV. The first engagement member 180a and the second engagement member 180b may receive a fastener for securing the first engagement member 180a and the second engagement member 180b to the supplemental support member 128. The supplemental support member 128 may include two elongated recesses 272. A guide member 276 may be disposed in one or more of the elongated recesses 272. The guide member 276 may be fixed to the support member 66 proximate the end wall 240 of the support member 66. The supplemental support member 128 may be slidably coupled to the guide member 276.

Referring to FIG. 13, the example of the support member 66 and the supplemental support member 128 shown in FIG. 12 is shown with the supplemental support member 128 in a fully extended position b. In the fully extended position b, the guide member 276 supports the supplemental support member 128. The supplemental support member 128 is shown partially nested in the support member 66 in FIG. 13. The supplemental support member 128 may be covered in a trim 264 that may match a trim 264 that may cover the seating assembly 10. Nubs 280 disposed on the forward wall 284 of the supplemental support member 128 may provide places for securing trim 264 to the supplemental support member 128.

Figures 14, 15:
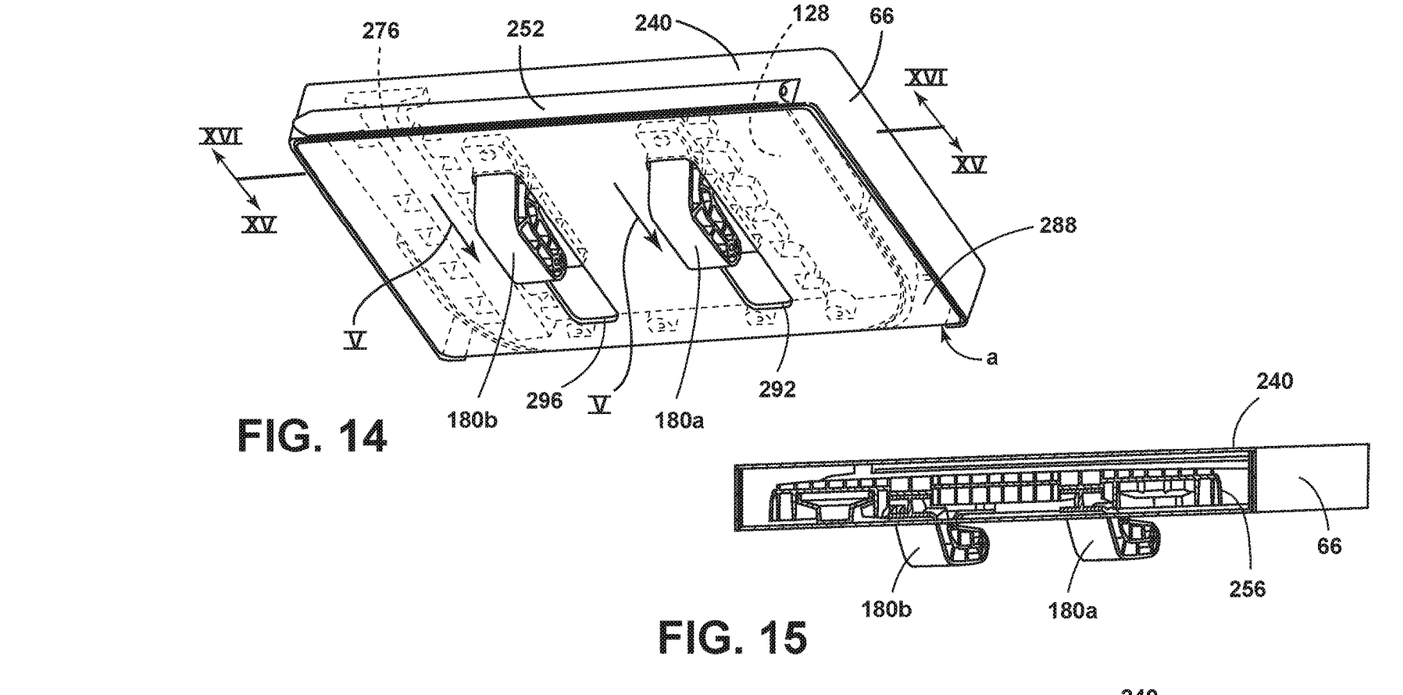
FIG. 14 is a bottom perspective view of the support member with a bottom panel and the supplemental support member in a retracted position, according to an example.
FIG. 15 is a cut-away view of the support member with a bottom panel and the supplemental support member taken along line XV-XV of FIG. 14 with the supplemental support member in a retracted position.

Referring to FIG. 14, an example of the support member 66 and an example of the supplemental support member 128 are shown. The example of the support member 66 shown in FIG. 12 includes a bottom panel 288. The supplemental support member 128 is shown in the retracted position a. The bottom panel 288 may include a first slot 292 and a second slot 296. The first and second engagement members 180a, 180b may be disposed in the respective first and second slots 292, 296. The first and second engagement members 180a, 180b may move within the first and second slots 292, 296 as the supplemental support member 128 slides between the retracted position a and the fully extended position b. The guide member 276 is shown in the support member 66.

FIG. 15 shows a cut-away perspective view of the support member 66 shown in FIG. 14. The guide member 276 is shown in the support member 66.

Figure 16:
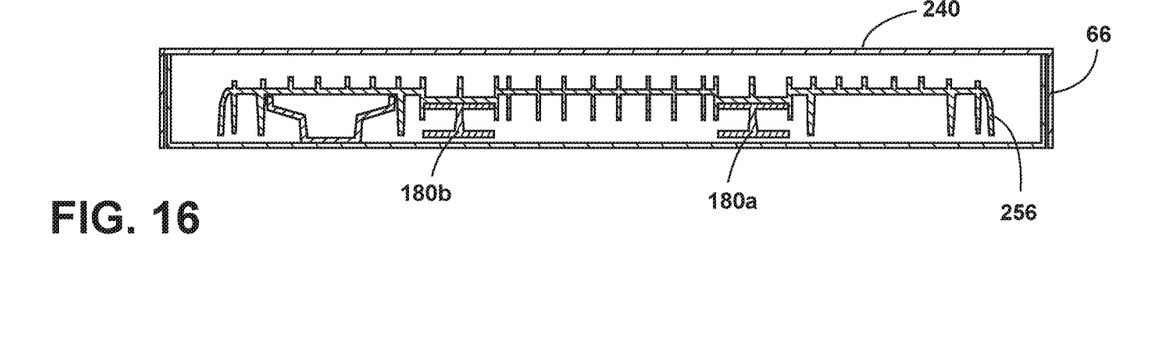
FIG. 16 is a cross-sectional view of the support member with a bottom panel and the supplemental support member taken along line XVI-XVI of FIG. 14 with the supplemental support member in a retracted position.

FIG. 16 shows a cross-sectional view of the support member 66 and the supplemental support member 128 shown in FIG. 15. The guide member 276 is shown disposed in the supplemental support member 128. As such, the support member 66 and the supplemental support member 128 may be designed to save space and to efficiently fit below the seat 60.

Figure 17:
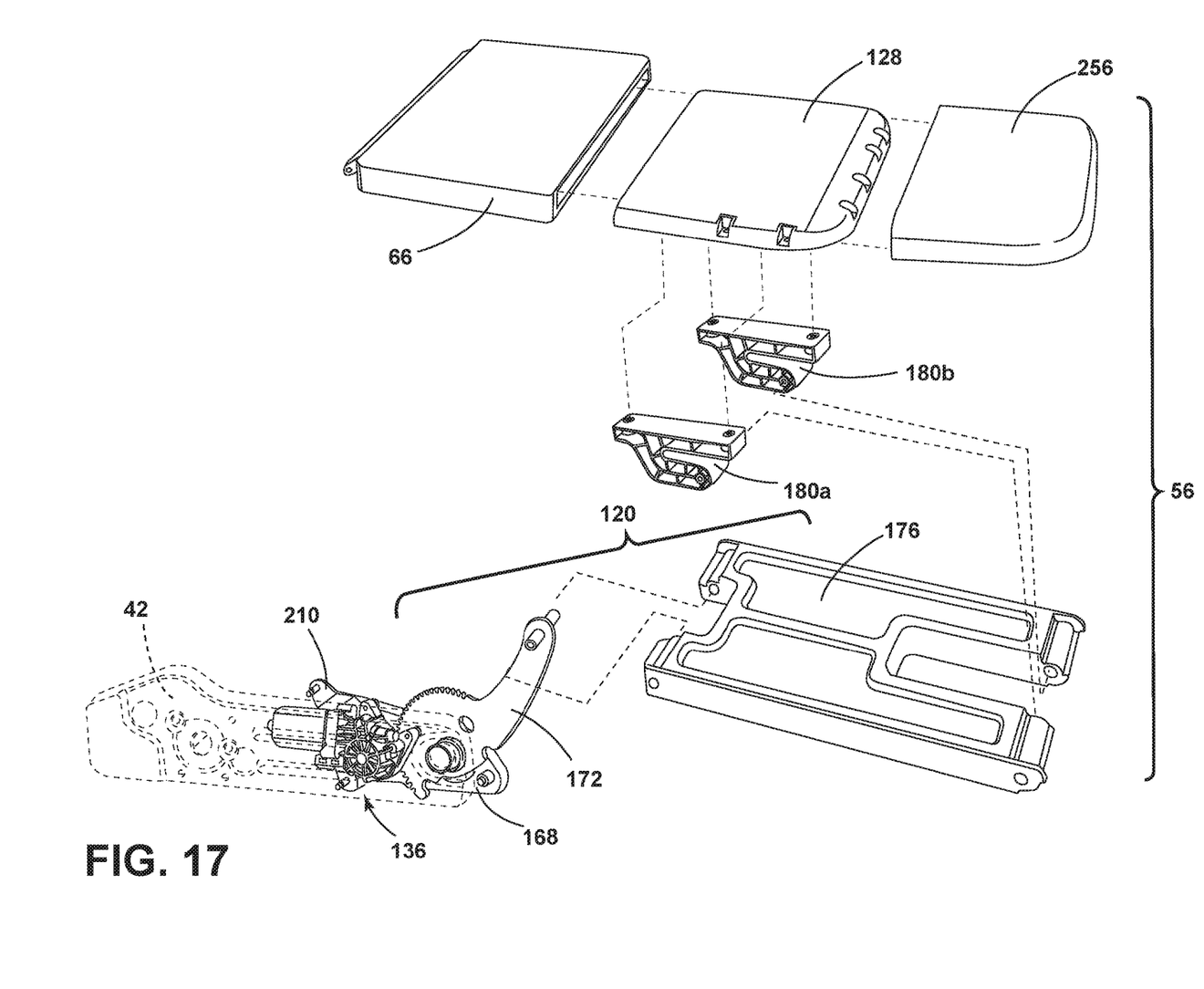
FIG. 17 is an assembly view of the leg support system.

Referring to FIG. 17, an assembly view of the leg support system 56 is shown. The bracket assembly 120 may include the bracket 172 and the lever 176. The support member 66 may be coupled to the lever 176. The supplemental support member 128 may be nested in the support member 66 in the stored position A. A cover 256 may be disposed over the supplemental support member 128. The supplemental support member 128 may include a first engagement member 180a and a second engagement member 180b. A rotational assembly 136 for driving the bracket assembly 120 is also shown.

A passenger may manually actuate the leg support system by pressing controls that may be physically attached to the vehicle. A passenger may also actuate the leg support system by using a wireless communication (for example, a key fob). The leg support system may be programmed with the preferred settings of a passenger.

In various examples, the support member 66 and the supplemental support member 128 may be made of a composite material. In various examples, the support member 66, supplemental support member 128, bracket assembly 120, and rotational assembly 136 disclosed herein may be used in conjunction with various seating assemblies. For example, the leg support system 56 may be used with the vehicle seating assembly disclosed in U.S. patent application Ser. No. 16/386,760, filed on Apr. 17, 2019, entitled Adjustable Seat, which is hereby incorporated herein by reference in its entirety.

A variety of advantages may be achieved by use of the leg support system 56. A passenger 12 may adjust the support member 66 and the supplemental support member 128 to suit individual preferences. The leg support system 56 may be conveniently disposed below the seat 60. The leg support system 56 may be used with the track assembly 14 of the vehicle 18.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members, connector or other elements of the system may be varied, and the nature or numeral of adjustment positions provided between the elements may be varied. It should be noted that the elements and/or assemblies of the system may be constructed from any of a wide variety of materials that provide sufficient strength or durability in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly comprising:
   a seat;
   a base member;
   an actuator supported on at least one of the seat and the base member;
   a toothed wheel drivingly coupled to the actuator;
   a support member pivotably coupled to the seat and rotationally movable between a first position and a second position;
   a bracket assembly, and
   a supplemental support member coupled to the bracket assembly and the support member, wherein the supplemental support member is translationally movable relative to the support member between a retracted position and a fully extended position;
   wherein the bracket assembly comprises a rotating bracket rotatably coupled to the actuator, a lever pivotably coupled to the rotating bracket, the lever pivotably coupled to the supplemental support member, wherein the rotating bracket includes a toothed portion, and wherein the actuator is configured to move each of the support member between the first and second positions and the supplemental support member between the retracted and extended positions by a toothed interface between the toothed portion and the toothed wheel.

2. The vehicle seating assembly of claim 1, wherein in the first position the support member is in a substantially vertical position transverse to an underbody frame.

3. The vehicle seating assembly of claim 2, wherein in the first position the support member is positioned at a first angle between a substantially vertical line along a front portion of the seat and a centerline of the support member, and wherein in the second position the support member is positioned at a second angle between the substantially vertical line along a front portion of the seat and the centerline of the support member.

4. The vehicle seating assembly of claim 3, wherein the first position includes a stored position.

5. The vehicle seating assembly of claim 4, wherein the second position includes a fully deployed position.

6. The vehicle seating assembly of claim 5, wherein the support member is positionable in a plurality of intermediate deployed positions between the stored position and the fully deployed position.

7. The vehicle seating assembly of claim 6, wherein the supplemental support member is fully nested within the support member in the retracted position.

8. The vehicle seating assembly of claim 7, wherein the supplemental support member is partially nested within the support member in the fully extended position.

9. The vehicle seating assembly of claim 8, further comprising:
   a guide member disposed in the support member.

10. The vehicle seating assembly of claim 9, further comprising an engagement member disposed on the supplemental support member and pivotably coupled to the bracket assembly.

11. The vehicle seating assembly of claim 10, wherein the lever is pivotably coupled to the engagement member.

12. The vehicle seating assembly of claim 11, wherein the engagement member includes a first engagement member and a second engagement member.

13. A vehicle seating assembly comprising:
- a seat;
- a base member;
- a bracket assembly coupled to a panel secured to the base member and including:
  - a rotating bracket that includes a toothed portion; and
  - a lever;
- a support member pivotably coupled to the seat and selectively positionable in a stored position, a fully deployed position, and an intermediate deployed position between the stored position and the fully deployed position;
- a telescoping supplemental support member disposed within the support member and selectively positionable in a retracted position, a fully extended position, and an intermediate extended position between the retracted position and the fully extended position; and
- an actuator, wherein the bracket assembly extends between the actuator and the support member, and wherein a toothed wheel drivably coupled to the actuator is selectively engageable to position the support member in the stored position, the fully deployed position, and the intermediate deployed position between the stored position and the fully deployed position;
- wherein the rotating bracket is rotatably coupled to the actuator, the lever is pivotably coupled to each of the rotating bracket and the supplemental support member, and wherein the actuator is configured to move the support member between the fully deployed and stored positions and the supplemental support member between the fully extended and retracted positions by a toothed interface between the toothed portion and the toothed wheel.

14. The vehicle seating assembly of claim 13, further comprising:
- an elongated guide member disposed in the support member, wherein the telescoping supplemental support member is slidably coupled to a channel in the elongated guide member, and wherein the supplemental support member slides along the elongated guide member between the retracted position and the fully extended position.

15. A leg support system comprising:
- a seat and a base member,
- a support member pivotably coupled to a forward portion of the seat and positionable between a first position and a second position,
- a supplemental support member slidably coupled to the support member and movable between a retracted position and a fully extended position,
- a bracket assembly partially disposed between the seat and the base member and including:
  - a lever pivotably coupled to a bracket, wherein the lever is pivotably coupled to the supplemental support member, wherein the bracket includes a toothed portion that is drivably coupled to an actuator by a toothed wheel, and wherein the actuator is selectively operable to move the support member between the first and second positions, and wherein the actuator is selectively operable to move the supplemental support member between the retracted and the fully extended positions.

16. The leg support system of claim 15, wherein the support member is rotatable about a pivot point disposed at a front portion of the seat, and wherein in the first position the support member is positioned in a substantially vertical position between the pivot point and an underbody frame, and wherein in the second position the support member is disposed at an approximately 30 degree to an approximately 70 degree angle from the first position.

17. The leg support system of claim 16, wherein:
the toothed wheel is coupled to the actuator; and
the toothed wheel and the toothed portion of the bracket form a toothed interface.

18. The leg support system of claim 17, wherein the leg support system is disposed in a vehicle seating assembly.

* * * * *